United States Patent [19]

Albarda

[11] Patent Number: 4,527,463

[45] Date of Patent: Jul. 9, 1985

[54] DOSING PUMP FOR LIQUIDS

[75] Inventor: Scato Albarda, Gross Schenkenberg, Fed. Rep. of Germany

[73] Assignee: Drägerwerk Aktiengesellschaft, Fed. Rep. of Germany

[21] Appl. No.: 624,608

[22] Filed: Jun. 26, 1984

[30] Foreign Application Priority Data

Sep. 1, 1983 [DE] Fed. Rep. of Germany ....... 3331558

[51] Int. Cl.³ .................. F16J 1/10; F04B 49/00
[52] U.S. Cl. .......................... 92/84; 417/214
[58] Field of Search ............. 417/568, 214; 92/84, 92/13.8, 13.51

[56] References Cited

U.S. PATENT DOCUMENTS

| | | | |
|---|---|---|---|
| 700,646 | 5/1902 | Hartness | 92/84 |
| 1,327,272 | 1/1920 | Dellgren | 92/84 |
| 2,712,793 | 7/1955 | Holm | 92/84 |
| 2,865,357 | 12/1958 | Mueller et al. | 92/84 |
| 3,169,674 | 2/1965 | Lund et al. | 92/13.8 |
| 3,545,896 | 12/1970 | Zahradnik | 92/13.8 |
| 4,323,333 | 4/1982 | Apter | 417/568 |

FOREIGN PATENT DOCUMENTS

| | | | |
|---|---|---|---|
| 221449 | 10/1961 | Austria | 92/84 |
| 018855 | 11/1980 | European Pat. Off. | 417/214 |
| 2629206 | 1/1978 | Fed. Rep. of Germany | 417/568 |

*Primary Examiner*—William L. Freeh
*Attorney, Agent, or Firm*—McGlew and Tuttle

[57] ABSTRACT

In volumetric dosing of liquids, equal mounts of a liquid must be added in equal time intervals to a primary flow which may consist of either liquid or gaseous substances. This is done most accurately by means of piston pumps as dosing pumps.

The dosing pump according to the invention affords simple design and reliable operation. The piston stroke is fixed by means of a collar in a limiting chamber. The compensation required to prevent double fits and compensates for wear, tolerances, etc. is obtained by an elastic length equalizer in the connecting rod. This arrangement leads to being normally represented as a rigid connection which, however, in the two end positions of the piston, when the forces rise suddenly due to the collar striking the limiters, equalizes these forces over the length.

1 Claim, 2 Drawing Figures

DOSING PUMP FOR LIQUIDS

BACKGROUND OF THE INVENTION

Field of the Invention

The invention relates, in general, to pumps and, in particular, to a new and useful dosing pump for liquids, with a piston in a cylinder and suction and pressure phases controlled and moved by a suction valve and a pressure valve and by an oscillating drive mechanism driving through a connecting rod.

In volumetric dosing of liquids, equal volumes of one or more measured secondary liquids must be added in equal time intervals to a primary flow which may comprise either liquid or gaseous substances. The admixture may be either continuous or discontinuous.

In the discontinuous operating mode, the secondary liquid may be bottled in individual, equal volumes, and they must be fed in at equal time intervals. Dosing can be adjusted either by varying the bottle volumina or the time intervals. Piston pumps are the most exact dosing pumps.

One known piston or plunger type of dosing pump is manufactured with piston diameters from 3 to 100 mm so that outputs from a few $cm^3/h$ up to several $m^3/h$ are obtained. The volumetric output can be adjusted continuously, usually also even when the pump is running, by varying the piston stroke. This is done by moving the fulcrum of a rocker which transmits the motion coming from the drive motor via an eccentric shaft, already transformed into a reciprocating motion by an eccentric rod, to the piston. The fulcrum shifting device is designed so that the piston always moves to the forward dead center constant for all adjustments. (Hengstenberg-Sturm-Winkler "Measuring and Controlling in Chemical Engineering", Springer 1964, pages 407 to 408). The dosing accuracy depends on the constancy of the piston stroke, and it depends on the inaccuracies of the drive mechanism. The chain of links between the drive motor and the plunger, due to the addition of the play of their bearings which are also subject to wear after a possible adjustment, results in a considerable uncertainty.

Another known piston pump with infinitely variable volume control is the cam pump. Its piston continues outside of the cylinder as a plunger. At its end the plunger supports a roll which follows the cam of a cam shaft. The plunger is spring-loaded in the direction of the cam shaft, i.e. in a suction stroke direction, by a spring resting against a stop. Adjustable nuts on the plunger limit the size of the stroke between the stop and these nuts. Depending on the plunger position, the plunger, through its roll, is in contact with the driven cam during some part of each cam shaft revolution. The pressure stroke occurs under the action of the cam against the spring and the suction stroke under the action of the return force of the spring. Between suction and pressure strokes, the plunger is caught at the stop by the nuts and its guide roll is lifted off the cam (Ullmann's Encyclopedia of Technical Chemistry, Third Edition 1951, Vol. 1 page 98). The accuracy of the volumetric output and its adjustment are limited in that only one end point of the stroke is fixed by the nuts contacting the stop, whereas the other end point is determined by the entire drive mechanism. Even though the spring acts also in the sense of suppressing the bearing play, inaccuracies in operation can nevertheless result, for instance, from the bearings not assuring centricity and, furthermore, from the drive mechanism having to overcome the spring force in addition to the pressure of the medium during the pressure stroke, thus being subject to increased wear. The stop does not engage in the immediate vicinity of the piston, which makes the actually maintained piston end point subject to other environmental influences.

SUMMARY OF THE INVENTION

The invention is a simply designed, most accurate dosing pump for liquids whose adjusted output remains reliably constant even after protracted operation.

According to the invention, the piston has a collar which, in a limiting chamber, limits the suction stroke by stroking a suction stroke limiter and the pressure stroke by striking a pressure stroke limiter, the necessary length tolerance being compensated by an elastic length equalizer in the connecting rod.

The length of the piston stroke is determined unequivocally and therewith the amount to be pumped. The number of strokes additionally required for this can be determined in normal, known ways. The double fit, to be avoided in mechanical equipment with rigid connections, and tolerance compensations, e.g. after wear, are obtained in simplest and sure manner by means of the elastic length equalizer. It permits continuation of the piston drive even when the most exact stroke length is reached after the collar strikes the respective stroke limiter in the limiting chamber. This arrangement leads to the connecting rod being normally represented as rigid connection which, however, in the two end positions of the piston, when the active forces suddenly rise to the stop, equalizes these forces over the length.

In one embodiment, the length equalizer comprises a tube which is connected to the drive mechanism and guided in a sleeve connected to the piston and closed by an end piece, the tube being closed by a bolt which is axially movable in it and is connected to a guide tube between the sleeve and the tube through a pin penetrating axially elongated holes in the tube, and an inner compression spring limiting the bolt in the elongated holes out of the tube, and an outer compresssion spring, supported by the end piece, pushing the tube beyond the tube guide to the bottom of the sleeve until it strikes a head of the bolt. This makes it apparent how the dosing pump according to the invention is designed in one embodiment, and also how it is actually controlled.

Another advantage results from the limiting chamber being controllable in its axial length by a regulating device. In this embodiment, the volumetric output of the dosing pump can also be regulated during operation.

Accordingly, it is an object of the invention to provide an improved dosing pump which includes a pump piston movable in a pumping chamber to pump liquid from a suction line into the chamber to a discharge pressure line which is driven by a crank drive mechanism through a connecting rod which has an elastic portion which permits extension or retraction of the connecting rod parts in accordance with the limitation of the stroke of the piston.

A further object of the invention is to provide a dosing pump which is simple in design, rugged in construction and economical to manufacture.

GENERAL DESCRIPTION OF THE PREFERRED EMBODIMENTS

Figure 1:
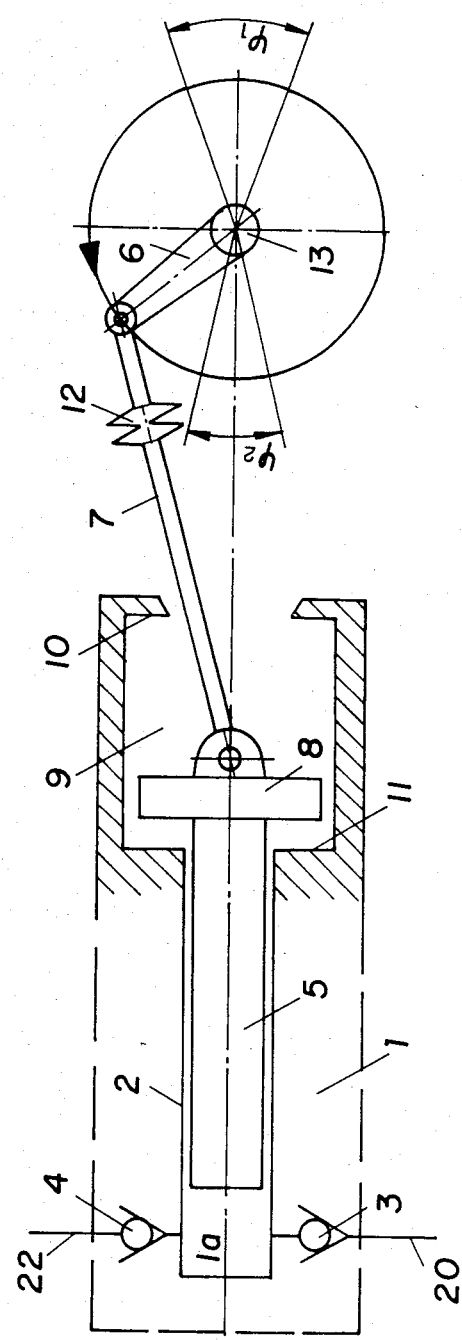
FIG. 1 is a partial axial sectional view of a dosing pump constructed in accordance with the invention.

Referring to the drawings, in particular, the invention embodied therein comprises a dosing pump which includes a dosing pump housing 1 having a pump chamber 1a with inlet means comprising an inlet line 20 connected through a check valve 3 to the pump chamber 1a and outlet means comprising an outlet or discharge check valve 4 connected to a discharge pressure line 22.

In accordance with the invention, the pump is provided with piston stroke limiting means which, in the embodiment illustrated, comprises a collar 8 affixed to the piston 5 which is movable in a limiting chamber 9 having stroke limiting ends or walls 10 and 11 at respective ends which regulate the length of the stroke of the piston. In accordance with another feature of the invention, drive means are connected to the piston 5 to move it backwardly and forwardly and it includes a crank 6 driving through a connecting rod 7 which has a length equalizer for extensible and retractible portion 12. Connecting rod 7 with the extendible and retractible parts permit extension and retraction of the piston rod in accordance with the limitation of the length of the stroke of the piston.

The dosing pump of FIG. 1 contains a piston 5 in a housing 1 with a cylinder 2 connected in known manner to an intake line 20 via a suction check valve 3 and to a discharge line 22 via a pressure check valve 4. The piston 5 is moved by a crank 6 via a connecting rod 7. The piston 5 has a collar 8, guided in a limiting chamber 9 of larger diameter than cylinder 2. The limiting chamber 9 limits the stroke of the piston 5 by engagement of a respective side of the collar 8 with a suction stroke limiter or end wall 10 and a shoulder or pressure stroke limiter 11. To circumvent double fits and compensate for tolerances, wear, etc., the connecting rod 7 has an elastic length equalizer 12. It is via this length equalizer 12 that the collar 8 strikes the suction stroke limiter 10 at the end of the suction stroke over the angle of rotation $\phi$ 1 and the pressure stroke limiter 11 at the end of the pressure stroke over the angle of rotation $\phi$ 2 of the crank shaft 13.

Figure 2:
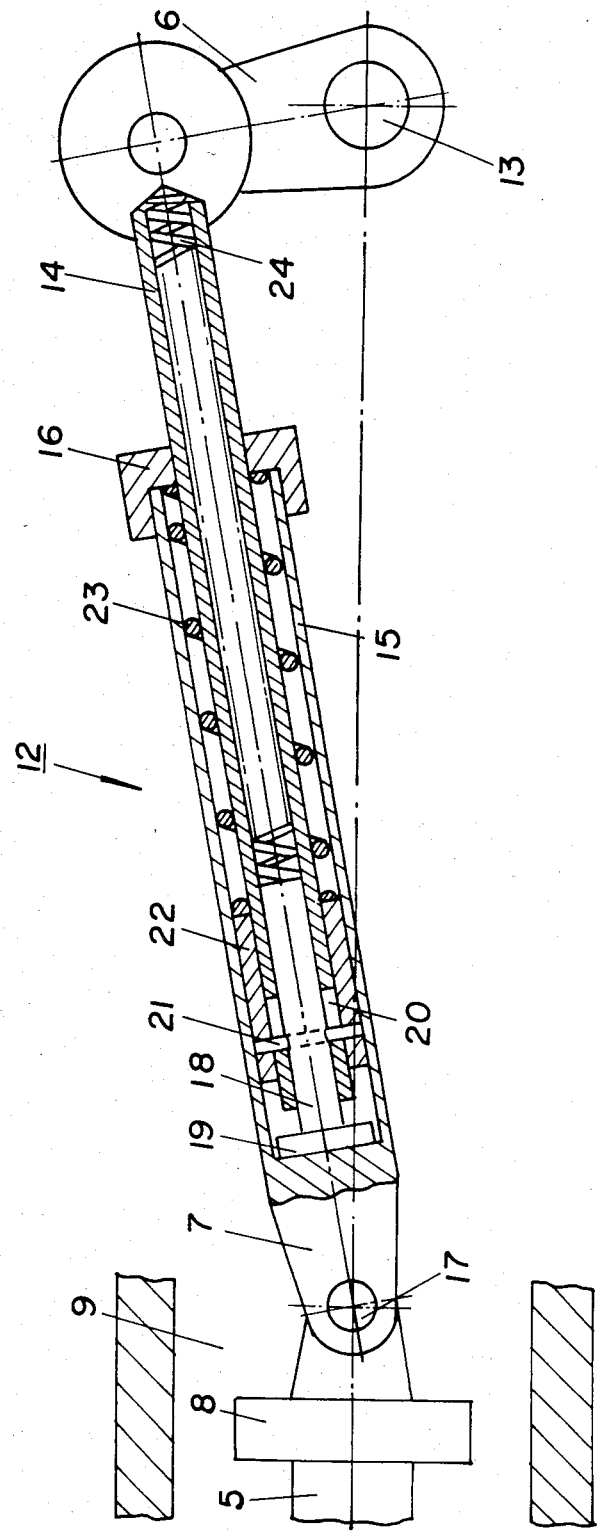
FIG. 2 is an enlarged detail indicating the construction of the connecting rod.

FIG. 2 shows one design of an elastic length equalizer 12. The connecting rod 7 contains a tube 14 connected to the crank 6. The tube 14 is guided in a sleeve 15 which is closed by an end piece 16 and connected at the opposite end to piston 5 via a pivot or joint 17.

A bolt 18, which has a head 19 resting against the bottom of the sleeve 15, is guided in the open end of tube 14. Axial, elongated holes 20, in turn, guide a pin 21 which connects the bolt 18 to a tube guide 22 so as to be axially movable, the tube guide 22 being movable over the length of these elongated holes 20 between the sleeve 15 and the tube 14.

An outer compression spring 23 between the sleeve 15 and the tube 14 biases the tube guide 22, and with the bolt 18 including its head 19, to the end of the elongated holes 20 on the piston and the opposite end of the spring bears against the end piece 16 an inner compression spring 24 in the tube 14, does likewise, pushed by its end at the crank 6.

If the piston 5 is moved to the left, i.e. in pressure direction according to FIG. 1, the collar 8 is caused to strike the pressure stroke limiter 11. The length is compensated in the connecting rod 7 by pressure against the head 19 and relative motion with the bolt 18 aginst the inner compression spring 24 in the tube 14 which slides over the bolt 18.

Compensation during the stroke limitation of the piston when moved to the right occurs after the collar 8 strikes the suction stroke limiter 10 not shown in that the crank 6 pulls the tube 14. At the end of the elongated holes 20 it pulls the pin 21, and with it the tube guide 22 in the sleeve 15 against the outer compression spring 23. This extends the connecting rod 7 as needed.

While specific embodiments of the invention have been shown and described in detail to illustrate the application of the principles of the invention, it will be understood that the invention may be embodied otherwise without departing from such principles.

What is claimed is:

1. A dosing pump comprising a housing having a pump chamber, inlet and pressure outlet means connected to said chamber, a pump piston movable in said chamber to draw fluid in said inlet means and pump it out said outlet means, piston stroke limiting means carried by said housing limiting the length of the stroke of said piston, drive means connected to said piston including a crank and a piston connecting rod connected between said crank and said piston, said piston connecting rod having elastically extendable and retractable parts which permit extension and retraction of said piston rod in accordance with the limitation of the length of the stroke of said piston, said piston connecting rod including a first part connected to said crank and a second part connected to said piston, one of said parts being hollow and the other of said parts being telescopic within said one of said parts, spring means within said hollow part biasing said parts to an outwardly extendible position, each of said first and second parts being hollow and wherein the hollow part which is connected to said crank has an opened end, a bolt positioned in the open end, a spring within said part connected to said crank biasing said bolt in a direction to engage said part connected to said piston, an axially extending slot defined in said part connected to said crank, a guide pin extending through said part and guided in said slot for axial movement and a second spring arranged around said part connected to said crank and biasing against said pin, said part connected to said piston having an end piece closing the end of said part around said part connected to said crank.

* * * * *